US006929307B1

(12) United States Patent
Grimm et al.

(10) Patent No.: US 6,929,307 B1
(45) Date of Patent: Aug. 16, 2005

(54) VEHICLE DOOR

(75) Inventors: Rainer Grimm, Frankfurt (DE); Harald Kollner, Altenstadt (DE); Klaus-Dieter Strauss, Braunschweig (DE); Georg Wurm, Bad Homburg (DE); Daniel Drewniok, Frankfurt (DE); Arnd G. Herwig, Baunach (DE); Patrick Hof, Marburg (DE); Simon Blair Dobson, Folkestone (GB); Klaus-Peter Maass, Isenbuttel (DE); Kenneth W. Schang, Plymouth, MI (US)

(73) Assignee: ArvinMeritor GmbH, Dietzenbach (DE)

( * ) Notice: Subject to any disclaimer, the term of this patent is extended or adjusted under 35 U.S.C. 154(b) by 0 days.

(21) Appl. No.: 10/089,032

(22) PCT Filed: Sep. 28, 2000

(86) PCT No.: PCT/EP00/09528

§ 371 (c)(1),
(2), (4) Date: Jun. 19, 2003

(87) PCT Pub. No.: WO01/23203

PCT Pub. Date: Apr. 5, 2001

(30) Foreign Application Priority Data

Sep. 28, 1999 (DE) ................................ 199 46 307
Apr. 12, 2000 (DE) ........................... 200 06 773 U

(51) Int. Cl.⁷ ............................................. B60D 25/04
(52) U.S. Cl. ............................... 296/146.5; 296/146.6; 296/146.7
(58) Field of Search .......................... 296/146.5, 146.6, 296/146.7, 30, 191, 203.03, 205, 208; 49/501, 49/502; 428/122

(56) References Cited

U.S. PATENT DOCUMENTS 5,056,861 A * 10/1991 Garnweidner et al. ... 296/146.6

(Continued)

FOREIGN PATENT DOCUMENTS

| EP | 0 483 895 | 5/1992 |
|----|-----------|--------|
| EP | 0 983 890 | 3/2000 |
| FR | 2 794 711 | 12/2000 |

OTHER PUBLICATIONS

International Search Report for PCT/EP00/09528 dated Jan. 15, 2001.

*Primary Examiner*—Kiran B. Patel
(74) *Attorney, Agent, or Firm*—Carlson, Gaskey & Olds

(57) ABSTRACT

Hollow-interior vehicle door consisting of an internal in its entirety essentially pot-shaped or pan-shaped stiffening structure, and of at least one external outer panel element being essentially lid-shaped and supported by the essentially pot-shaped or pan-shaped stiffening structure, such as a door skin, as well as of functional parts for practicing the door functions, and of optionally an inner panel element, in which the essentially pot-shaped or pan-shaped stiffening structure serves to accommodate functional parts of the vehicle door. The essentially pot-shaped or pan-shaped stiffening structure is divided into two parts, in fact, into a first frame-shaped stiffening element (12) for supporting the outer panel element (outer panel 10) and into a second essentially pot-shaped or pan-shaped stiffening element (14) for supporting functional parts of the vehicle door (1) and that the two stiffening elements (12 and 14) have, in the area of the outward-pointing, thus in Y-direction pointing, side walls of the door interior (1A), elongated, preferably frame-shaped connecting surfaces (18 and 18') which define the access opening (1B) to the door interior (1A).

12 Claims, 5 Drawing Sheets

U.S. PATENT DOCUMENTS

| | | | |
|---|---|---|---|
| 5,822,927 A | 10/1998 | Hellenkamp et al. | |
| 5,857,732 A * | 1/1999 | Ritchie | 296/146.5 |
| 5,906,072 A * | 5/1999 | Feige et al. | 296/146.7 |
| 6,226,927 B1 * | 5/2001 | Bertolini et al. | 49/502 |
| 6,231,112 B1 * | 5/2001 | Fukumoto et al. | 296/146.5 |
| 6,412,852 B1 * | 7/2002 | Koa et al. | 296/146.5 |
| 6,474,721 B2 * | 11/2002 | Nishikawa et al. | 296/146.6 |
| 6,615,546 B2 * | 9/2003 | Furuyama et al. | 296/146.7 |
| 6,616,216 B2 * | 9/2003 | Furuyama et al. | 296/146.7 |
| 6,641,204 B2 * | 11/2003 | Ogawa et al. | 296/146.9 |
| 6,659,537 B2 * | 12/2003 | Moriyama et al. | 296/146.6 |
| 6,676,195 B1 * | 1/2004 | Marriott et al. | 296/146.7 |
| 6,779,831 B2 * | 8/2004 | Moriyama | 296/146.6 |
| 2001/0025456 A1 * | 10/2001 | Furuyama et al. | 296/146.7 |
| 2002/0073627 A1 * | 6/2002 | Hock | 296/146.5 |
| 2004/0080179 A1 * | 4/2004 | Okazaki et al. | 296/146.6 |

* cited by examiner

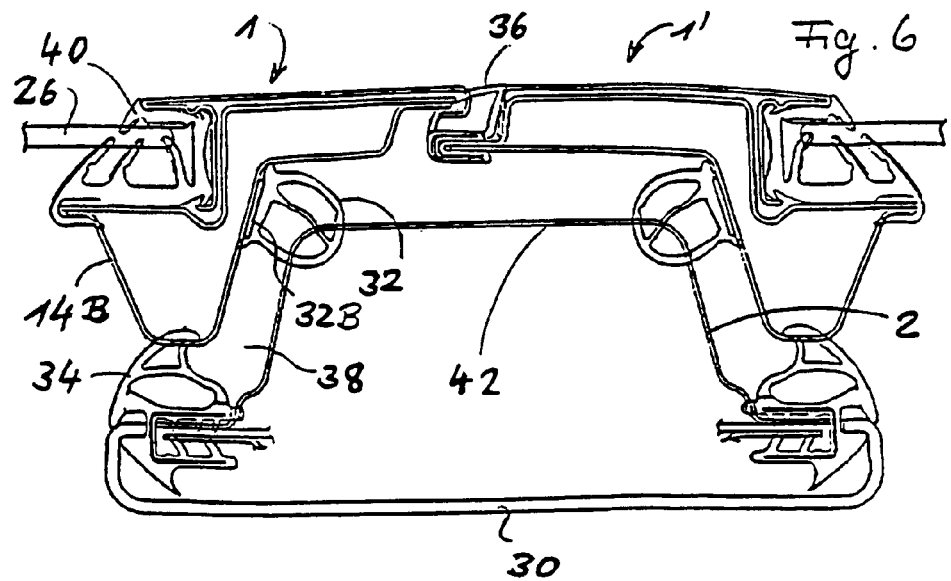
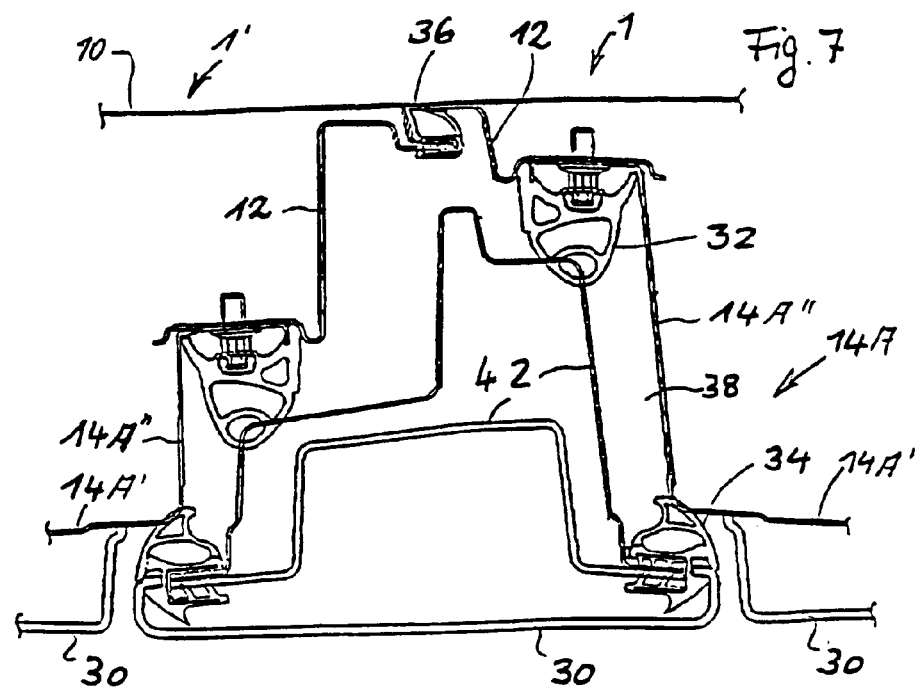

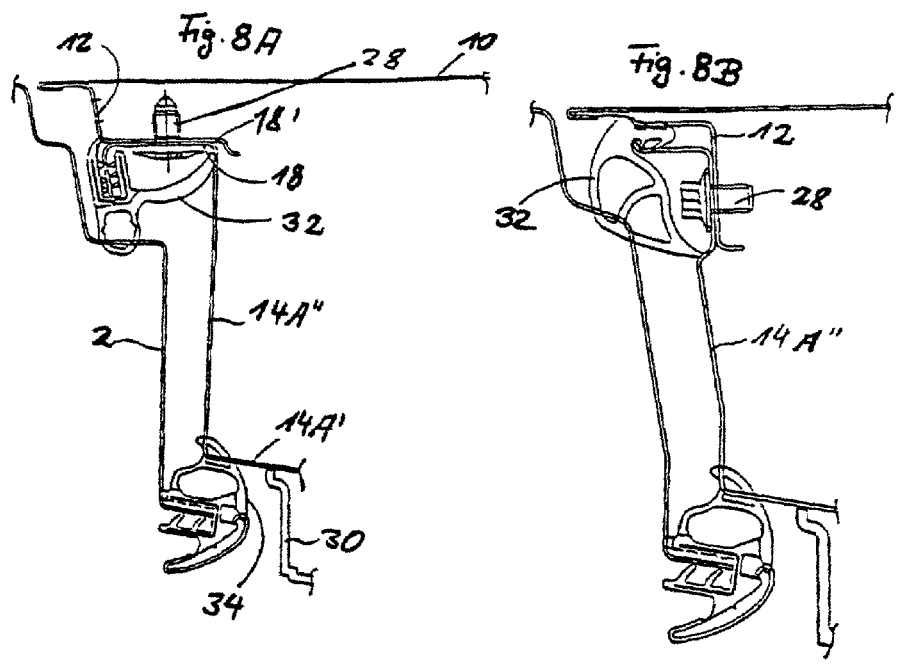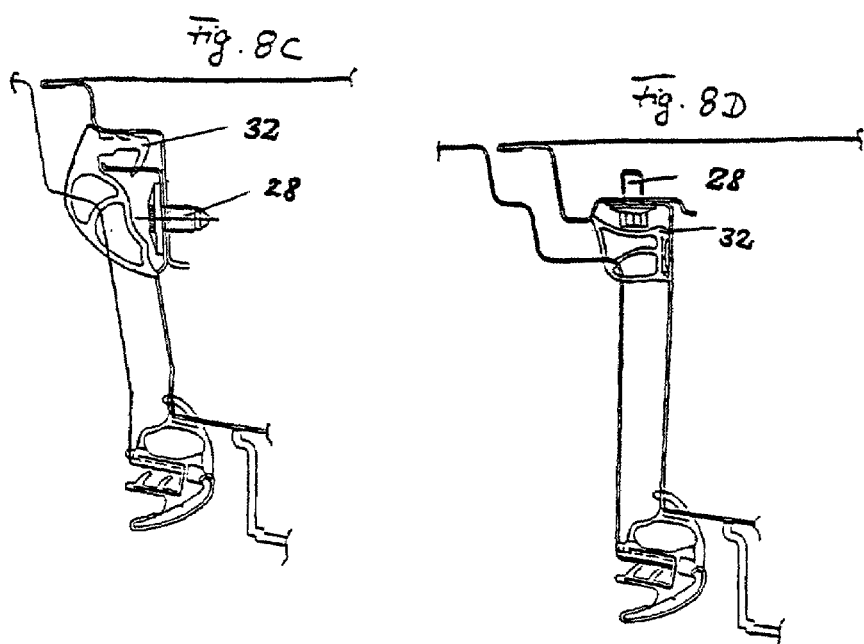

VEHICLE DOOR

BACKGROUND OF THE INVENTION

The invention pertains to a hollow-interior vehicle door consisting of an internal in its entirety essentially pot-shaped or pan-shaped stiffening structure, and at least one outer panel element being supported by the essentially pot-shaped or pan-shaped stiffening structure, such as a outer door skin, and optionally an inner panel element, in which the essentially pot-shaped or pan-shaped stiffening structure serves to accommodate functional parts of the vehicle door, such as a hinge, hinge plate or other moving element and/or a closure element, which are or can be connected to the essentially pot-shaped or pan-shaped stiffening structure or are housed in it.

In conventional vehicle doors it is common to join a supporting and in its entirety essentially pot-shaped or pan-shaped stiffening structure, a so-called inside panel, to the essentially lid-shaped outer panel by peripheral welding, flanging or adhesion, and to install the vehicle door in this state in the vehicle with the door opening to be closed, with or without functional parts such as lock, hinge, window lift and the like already installed in the support element. For some time, the essentially pot-shaped or pan-shaped stiffening structure has been provided on the inside of the vehicle with a closable service opening, wherein an essentially flat lid extending essentially vertically closes said service opening. As a rule, this lid consists of thin plain sheet metal which is slightly formed to fit to the functional parts to be accommodated and which supports some of the functional parts, such as a window lift, a speaker and the like and which has a sealable fastening edge to be bolted to the actual essentially pot-shaped or pan-shaped stiffening structure and to seal the service opening. The actual essentially pot-shaped or pan-shaped stiffening structure consists of a so-called inside panel, which is shaped relatively extensively and forms both the inner side wall of the door interior featuring the service opening and running parallel to the door and the outward-extending side walls of the hollow door interior which extend in the direction perpendicular to the door, and which is permanently joined at its outer edge to the so-called outside panel forming the door skin by the aforementioned flanging process or the like.

Despite the considerable size of the service opening, assembly of the known vehicle door as well as service work require considerable effort, particularly with respect to the raisable and lowerable window panes, which are largely submerged in the door interior in the open state. The installation of a desirable second door seal, particularly in the form of a continuous peripheral gasket proves difficult and prone to malfunctions with the known vehicle doors.

SUMMARY OF THE INVENTION

Against this background, the invention is based on the object of achieving an easing of assembly for doors of this class and a vehicle door with a high rigidity, at the same time. Also desirable is an improved protection of the functional parts of the vehicle door against moisture.

This object is solved by a vehicle door with the characteristics of claim 1.

The invention is accordingly based on the fundamental idea of designing the essentially pot-shaped or pan-shaped stiffening structure of the vehicle door in two parts in such a manner that the outer panel element is connected with a frame-shaped first stiffening element whose frame-shaped connection edge to the second essentially pot-shaped or pan-shaped stiffening element defines the access opening into the door interior, wherein the second stiffening element is essentially pot-shaped or pan-shaped and supports functional parts of the vehicle door. The line of division of this at least two-part essentially pot-shaped or pan-shaped stiffening structure thus lies in the area of the outward-pointing side wall of the door interior, as viewed in the direction perpendicular to the door.

Thereby the size of the service opening is expanded to a maximum and, in particular, the installation of a raisable and lowerable window pane is considerably simplified, as is any service or repair work.

It is possible to construct the at least two-part essentially pot-shaped or pan-shaped stiffening structure in various ways for any concrete case. On the one hand, it is possible to fasten the hinge plates for the door hinges to the frame-shaped first stiffening element, as previously, thus to install the essential parts of the outer panel along with the actual setting, that is, the precisely positioned installation of the vehicle door in the vehicle opening to be closed off and to assemble the inner pot-shaped or pan-shaped part of the stiffening structure only after setting the door if desired. On the other hand, it is also possible, to mount nearly all the functional parts, i.e., the hinge plates of the hinges, the door lock, and also the possibly present raisable and lowerable window pane as well as any window frame that may be present, on the pot-shaped or pan-shaped part of the stiffening structure. Nonetheless, such a vehicle door according to the present invention can also be set in the conventional manner, that is, in the nearly completely assembled state, in which all that is missing is the possible inner panel.

With regard to the connection between the externally situated, first stiffening element of the stiffening structure and the outer skin of the door, both conventional joining methods such as flanging and novel joining methods such as bonding with synthetics having a spacing effect are possible.

The connecting surfaces of the two parts of the essentially pot-shaped or pan shaped stiffening structure can extend both parallel to the door and in the normal direction to it. In the first, particularly preferred case, a fastening flange roughly parallel to the door and outward-pointing adjoins the lateral outward-pointing side walls of the pot-shaped or pan-shaped stiffening element, so that fastening means like rivets or bolts are applied perpendicular to the door. In an alternative arrangement of the connecting surface in a direction extending perpendicular to the door, the fastening means are applied roughly parallel to the door. Between these two extreme positions, intermediate positions of the connecting surfaces in any arbitrary angle between 0 and 90° to the door surface parallels are possible.

It is possible within the scope of the invention, moreover, to arrange the connecting surfaces between the two parts of the stiffening structure at an arbitrary depth in the area of the outward-pointing side walls in relation to the normal direction of the outer door surface, that is to say, to arrange them both extremely close to the outer door skin and relatively far away from it towards the inside or in alterable depth. In each case, the pot-shaped or pan-shaped stiffening element has a not insignificant part, possibly even the predominant part, for the rigidness of the stiffening structure.

The position of the connection line of the two parts of the essentially pot-shaped or pan-shaped stiffening structure has special meaning for an additional reason: due to the position of this connection line in the area of the outward-pointing side wall it becomes possible to use the connection area of the two parts of the essentially pot-shaped or pan-shaped stiffening structure to hold a door-side, in particular, wraparound second sealing line. Since the chassis-side door seal is ordinarily mounted relatively far in towards the vehicle interior on an dge of the chassis, the further outward door-side sealing line creates a double seal as well as a cavity enclosed by the two seals. Thereby, not only the sealing function but also the sound damping of outside noise is considerably improved. The placement of the door-side sealing line in the connection area of the two parts of the essentially pot-shaped or pan-shaped stiffening structure also makes it possible to cover the transition between the two parts of the stiffening elements, thus making it invisible, and also to seal it off. Likewise, a natural boundary is achieved between the door surfaces which are part of the exterior painting and the surfaces which belong to interior decoration.

By means of double-acting fastening means, such as threaded joint bolts with a head having an adhesive area for clamped application of the seal, not only is assembly made easier, but so is any later removal of the seal in case of repair or service work, as well as the reusability of the seal and the joint bolt.

The aforementioned components, as well as those claimed and those described to be used according to the invention in the embodiments, are not subject to any particular exceptional conditions regarding their size, design, material selection and technical conception, so that the selection criteria familiar in the field of application can be applied without restriction.

BRIEF DESCRIPTION OF THE DRAWINGS

Additional details, characteristics and advantages of the object of the invention result from the subordinate claims as well as the description below of the associated drawing, in which, for the sake of example, a preferred embodiment of the vehicle door according to the invention is represented. Shown in the drawing are:

FIG. 6 illustrates a partial view of a section through the same vehicle door taken along line VI—VI of FIG. 1 and supplemented with a B-pillar and a part of the rear vehicle door on the same side;

FIG. 7 illustrates a partial view of a section through the same vehicle door taken along line VII—VII of FIG. 1 and FIG. 2 as well as supplemented with the B-pillar and a part of the rear vehicle door on the same side; and FIGS. 8A–D illustrate alternative embodiments of the seal arrangement of the right front vehicle door in the area underneath the window sill, in horizontal section.

DETAILED DESCRIPTION OF A PREFERRED EMBODIMENT

Figure 1:
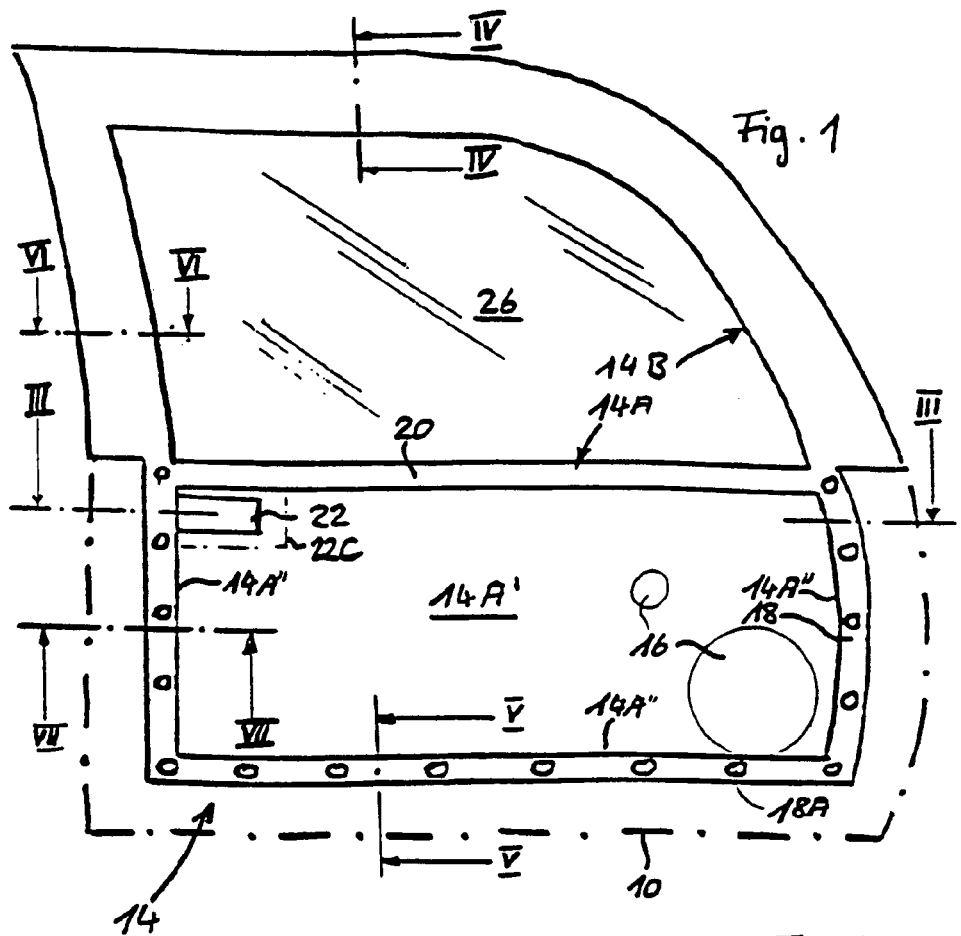
FIG. 1 illustrates schematically a first stiffening element of a right front vehicle door as part of the essentially pot-shaped or pan shaped stiffening structure with an integrated window frame in a view looking in from outside.
Figure 2:
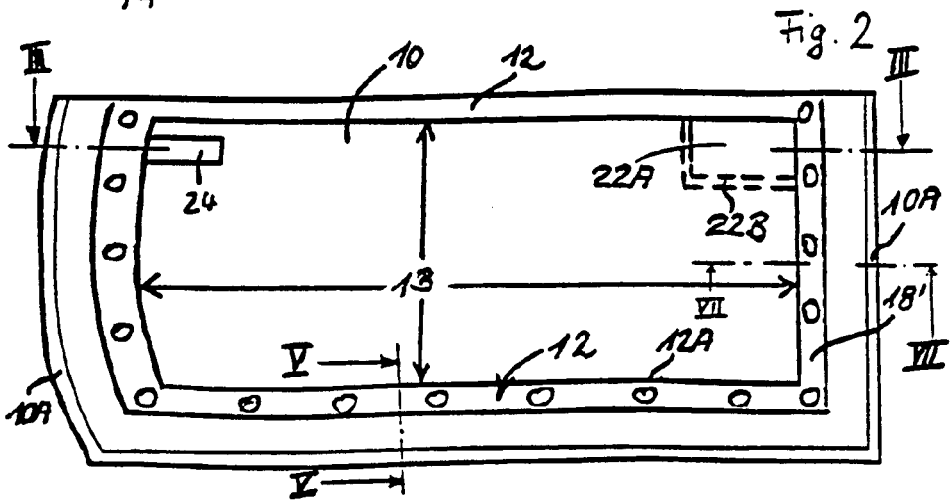
FIG. 2 illustrates an outer panel element of the same vehicle door with a second stiffening element of the essentially pot-shaped or pan shaped stiffening structure in a view looking out from the inside.

For the vehicle door according to FIGS. 1 and 2, an outside panel element in the form of an outside panel 10 forms the outer skin of the vehicle door 1 and is stiffened on an inner side, shown in FIG. 2, by a frame-shaped first stiffening element 12 at the outer peripheral zones of the outside panel 10. The connection between the two components is accomplished by a flanged joint 10A in a conventional manner. The design of the frame-shaped first stiffening element 12 will be explained further in conjunction with FIGS. 3–8. Optionally, the vehicle door includes an inner panel element 30.

The second part of the stiffening structure, referred to as a second stiffening element 14 and visible in FIG. 1, overall is made of one essentially pot-shaped or pan-shaped component, punched in one piece from sheet metal and shaped by deep drawing. The second stiffening element 14 includes of a roughly pot-shaped or pan-shaped part 14A and a window frame part 14B. The pot-shaped or pan-shaped part 14A has a bottom surface 14A' which has cutouts 16 for the installation of a window-lift motor, a loudspeaker or the like. At the periphery of the bottom surface 14A', it is adjoined by circumferenced side walls 14A" in an extension direction running roughly perpendicular to the door plane. These will become more clearly recognizable in conjunction with the figures below. Adjoining the side walls 14A" are, in turn, flange-like and outwardly pointing connecting surfaces 18 and a sill reinforcement 20, respectively. The two stiffening elements 12 and 14 have in the area of the outward-pointing, thus Y-direction pointing, side walls of the door interior, elongated, preferably frame-shaped, connecting surfaces 18 and 18A which define an access opening 1B to the door interior 1A. Together with the fastening holes 12A of the first stiffening element 12, fastening holes 18A permit a detachable bolting of the first stiffening element 12 and the second stiffening element 14, as will become more evident from subsequent figures. The second stiffening element 14 serves, among other things, for the mounting of a door lock 22.

A box sheet 22A in one piece, for instance, optionally provided on the first stiffening element 12 and having peripheral sealing lips 22B, permits complete encapsulation of the door lock 22 in the assembled state by contacting the sealing lips 22B with the bottom surface 14A' of the second stiffening element 14. A sealing line 22C is indicated with dots and dashes in FIG. 1.

As an additional functional part, the second stiffening element 14 bears a raisable window pane 26. For the sake of clarity, the conventionally known lifting mechanism is not separately illustrated.

Figure 3:
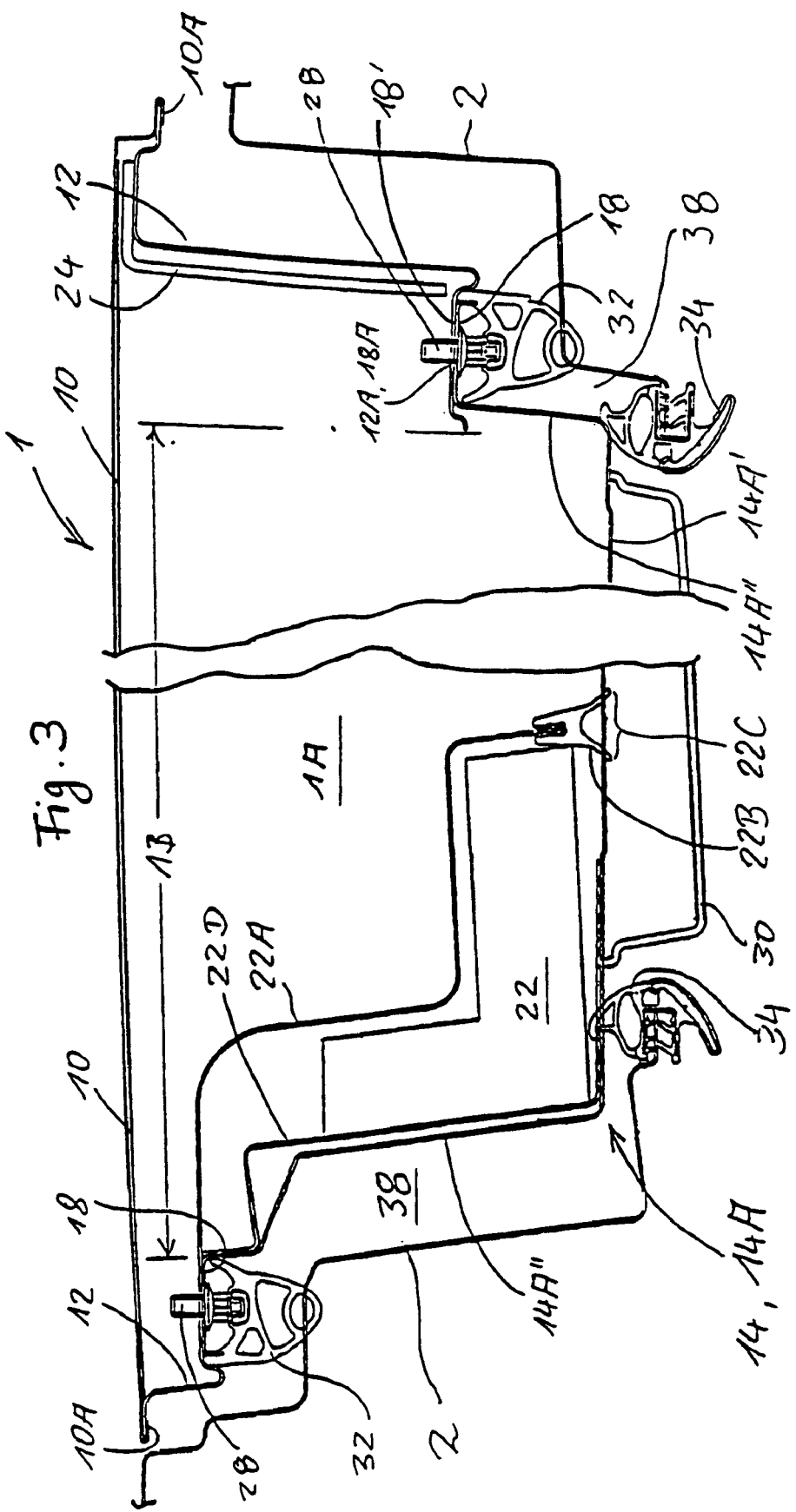
FIG. 3 illustrates a partial view of the same vehicle door in a horizontal section taken along line III of FIG. 1 and FIG. 2, as well as parts of the vehicle chassis adjoining a door opening.

The pot-shaped or pan-shaped part 14A of the second stiffening element 14 is clearly shown in FIG. 3, in particular, the outwardly pointing side walls 14A" and the adjoining connecting surfaces 18 project outwardly like flanges. The height of the side walls 14A' can be different in different areas of the second stiffening element 14, that is, the connection line to the first stiffening element 12 can be a different distance from the outside panel 10, i.e., the outer skin of the vehicle door 1, according to technical and mechanical circumstances. Thus, in the embodiment illustrated in FIG. 3, the encapsulated door lock 22 with the lock reinforcement sheet 22D is fastened to the second stiffening element 14, while an opposing door hinge part 24 is fastened to the first stiffening element 12.

It can also be seen from FIG. 3 that in the present embodiment, the first stiffening element 12 as the outside-facing part of an ordinary inside door sheet can be joined to the outside panel 10. However, the first stiffening element 12 is provided with an inwardly pointing frame-shaped flange with connecting surfaces 18' that run roughly parallel to the vehicle door 1. These and the associated fastening holes 18A correspond to the connecting surfaces 18 and the associated connecting holes 12A of the second stiffening element 14 and allow nonpositive threaded fastening of the first stiffening element 12 and the second stiffening element 14 by connecting bolts 28. As shown in FIG. 3, the first stiffening element 12 and the second stiffening element 14 contact at the connecting surfaces 18 and 18'.

Alongside the driving flats 28A' for a spanner, the heads 28A of the connecting bolts 28 have clamping surfaces 28" in the form of a continuous peripheral groove. In this way, a clamped connection to the peripheral hollow-chamber profiled piece (profiled seal 32) described below becomes possible (FIG. 5) in sense of a second function of the heads 28A.

As shown in FIGS. 3–8, the connection point between the first stiffening element 12 and the second stiffening element 14, as shown in the drawings and in that sense preferred, is covered and sealed off by a continuous peripheral profiled seal 32. This profiled piece represents a "natural" visual boundary between the first stiffening element 12, possibly painted the vehicle color, and the second stiffening element 14, possibly painted a neutral color, such as anthracite. The profiled seal 32 is employed because a second sealing line is situated far to the outside. In contrast to the known chassis-side first seal (profiled seal 34), the profiled seal 32 is fastened towards the vehicle door 1 and permits the formation of a continuous peripheral sealed chamber 38 between the vehicle door 1 and the vehicle chassis 2. A third sealing line 36, as shown in FIGS. 6 and 7, may be desirable, for instance, between adjacent doors. A uniform course of the profiled seal 32 free of undulations, as well as easy detachability in case of repair or service and easy installation, is achieved by a spring clip 32A inserted into a bottom groove of the profiled seal 32, which enables a clamped connection of the profiled seal 32 to the clamping surfaces 28A" of the connecting bolts 28.

In FIGS. 3–8D, the seals are each shown in a relaxed state, even if the concretely illustrated installation position causes a deformation of the seal. Thereby, the seals illustrated in this manner cut the adjacent component, instead of clinging tightly to it. This mode of illustration is done only for the sake of simplicity. Cross-hatching of the sections is likewise omitted for the sake of clarity.

Figure 4:
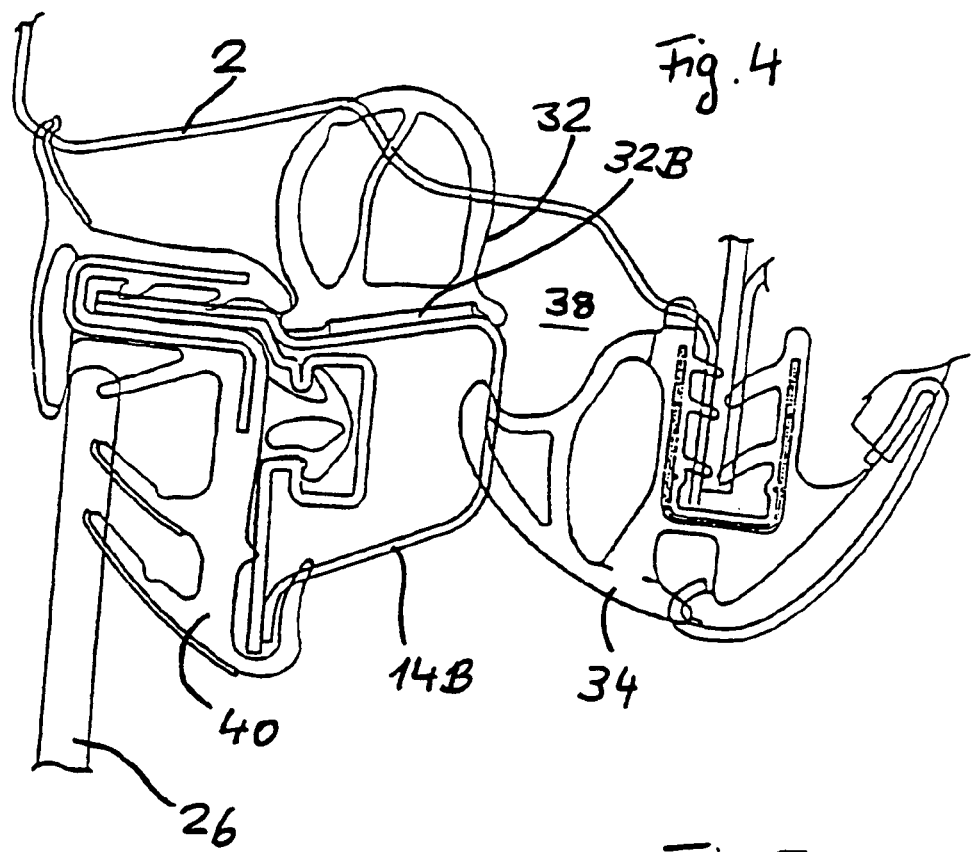
FIG. 4 illustrates a partial view of a section through the same vehicle door taken along line IV—IV of FIG. 1 and supplemented by parts of the chassis adjoining the vehicle opening.

It is evident from FIG. 4 that the second stiffening element 14 in the embodiment illustrated includes a window frame part 148 which bears a pane guide/seal 40 for the raisable and lowerable window pane 26. The door-side profiled seal 32 is joined in this area to the second stiffening element 14 by a conventional double-sided adhesive tape 32B.

Figure 5:
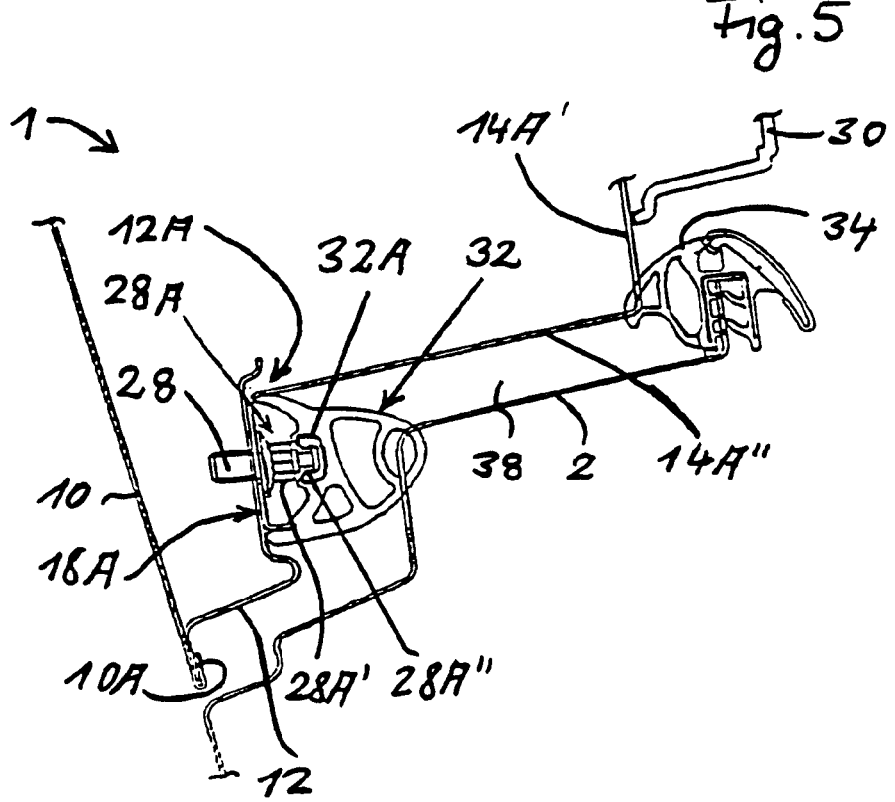
FIG. 5 illustrates a partial view of a section through the same vehicle door taken along line V—V of FIG. 1 and FIG. 2, as well as supplemented with parts of the vehicle chassis adjoining the door opening.

The so-called rocker panel area of the vehicle door 1 can be seen in FIG. 5.

In FIG. 6, the vehicle door 1 is shown in the area of the so-called B-pillar 42 above the sill line. The profiled seal 32 is joined to the window frame part 14B by double-sided adhesion. The rear vehicle door 1' is constructed in a similar manner to the front vehicle door 1.

FIG. 7 shows the door situation at the B-pillar 42 below the sill line.

FIG. 8 shows four variants for the connection of the first stiffening element 12 and the second stiffening element 14 and for the arrangement, fastening and shaping of the second sealing line, wherein for similar components the same reference numerals are used again.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specially described. For that reason the following claims should be studied to determine the true scope and content of this invention.

What is claimed is:

1. A hollow-interior vehicle door comprising:
   an outer panel element;
   a functional part; and
   an internal stiffening structure, wherein said internal stiffening structure includes a first stiffening element for supporting said outer panel element and a second stiffening element for supporting said functional part, wherein said first stiffening element and said second stiffening element contact at a connecting surface which defines an access opening to a door interior.

2. The vehicle door according to claim 1, wherein said second stiffening element further includes a window frame.

3. The vehicle door according to claim 1, wherein said first stiffening element includes an inwardly pointing wall and said second stiffening element includes an outwardly pointing wall, and said connecting surface is formed by said outwardly pointing wall of said second stiffening element and said inwardly pointing wall of said first stiffening element.

4. The vehicle door according to claim 1, further including a seal that seals the vehicle door with respect to a vehicle chassis and is arranged on a door side of said connecting surface between said first stiffening element and said second stiffening element.

5. The vehicle door according to claim 4, wherein a connecting bolt secures said first stiffening element to said second stiffening element, said connecting bolt including a bolt head having a clamping surface for clamping said seal.

6. The vehicle door according to claim 1, further including a lock compartment wall provided on one of said first stiffening element and said second stiffening element and a free wall provided on the other of said first stiffening element and said second stiffening element, wherein said free wall is sealingly supported against said one of said first stiffening element and said second stiffening element to encapsulate a door lock.

7. The vehicle door according to claim 1, wherein said functional part is at least one of a hinge, a hinge plate, a closure element, a window lift and a loudspeaker.

8. The vehicle door according to claim 1, further including an inner panel element.

9. The vehicle door according to claim 1, wherein said internal stiffening structure is substantially pan-shaped.

10. The vehicle door according to claim 1, wherein said outer panel element is substantially lid-shaped.

11. The vehicle door according to claim 1, wherein said first stiffening element is substantially framed shaped and said second stiffening element is substantially pan-shaped.

12. The vehicle door according to claim 1, wherein said functional part is a hinge.

* * * * *